March 21, 1939. S. G. WASHBURN 2,151,491
SNOW PLOW
Filed March 21, 1938

INVENTOR.
Selden G. Washburn,
BY Geo. Stevens.
ATTORNEY.

Patented Mar. 21, 1939

2,151,491

UNITED STATES PATENT OFFICE 2,151,491

SNOW PLOW

Selden G. Washburn, Goodwin, S. Dak.

Application March 21, 1938, Serial No. 197,230

5 Claims. (Cl. 37—43)

This invention relates to snow plows and has for its principal object the provision of simple and practical means for the control of the entrance of snow into the snow removing element of the plow.

Another object is to provide simple means whereby to handle heavy, crusty, or icy snow with equal facility to that of the finer loose and fluffy snow.

Another object is that of providing simple means for modifying the direction of discharge from the plow.

Still other objects and advantages of the invention will appear in the following description thereof.

Referring now to the accompanying drawing, forming part of this application and wherein like reference characters indicate like parts:

Figures 1, 2, 3:
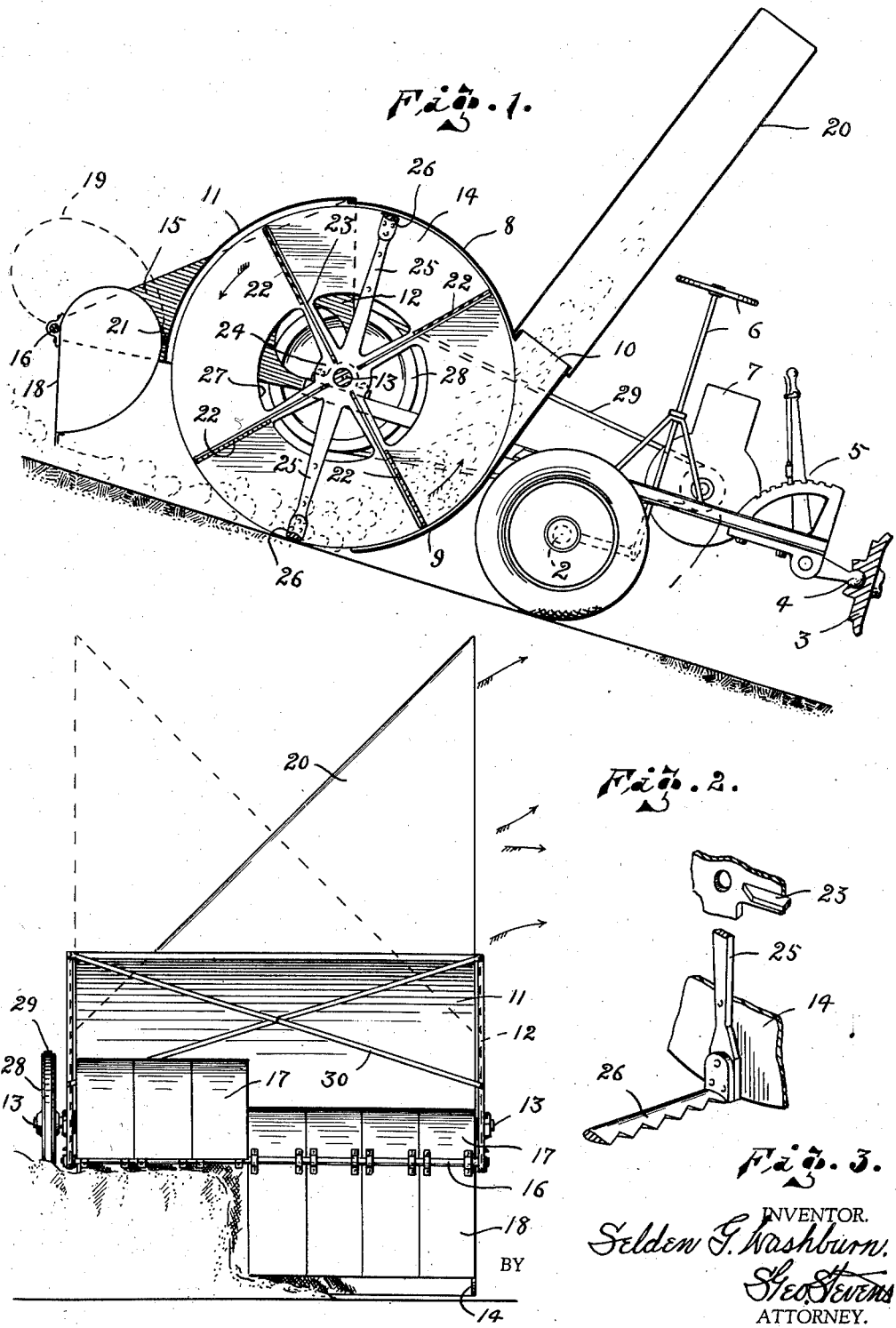
Figure 1 is a side elevation partly in section and partly broken away of a unit embodying the invention.
Figure 2 is a front elevation of the embodiment shown in Figure 1 illustrating an adjusted position of the entrance control mechanism of the plow.
Figure 3 is an enlarged perspective view of one end of the toothed chopping elements of the plow.

In the drawing, 1 represents the chassis frame of the unit which may be of fabricated metal such as channel iron or the like and which is supported in any desired manner upon a supporting wheeled axle indicated at 2, thus providing an oscillatory two wheeled unit designed to be pushed by another vehicle, the front bumper bar of which is illustrated at 3, to which I have shown the chassis of my snow plow sulky as being connected by the ball and socket joint 4 controlled with the quadrant and lever indicated at 5, the latter being an integral part with the ball arm thereof so that by such construction the plow sulky is free to be operated either laterally or vertically, irrespective of the pushing vehicle. While I have shown such a connection as a practical one it is to be understood that this may be greatly varied without departing from the spirit of the invention, as may be true of other features of the instant showing, described later.

For the steering of the plow sulky I have illustrated the steering post and wheel 6, which may be positioned as desired and suitably connected with the wheels on which the device is supported, though only diagrammatically shown. A power unit of any desired mechanism and connection is illustrated at 7.

Within the forward and free end of the chassis 1 is rotatably mounted a centrifugal fan or blower, the general details of which may vary considerably in construction to that illustrated, as such a device is well known in the art, with the exception that the housing for the rotor of the fan is made in sections, the rearmost portion or approximate half being a fixed structure, the upper section of which is illustrated at 8 and the lower section at 9, they meeting in the rearmost portion of the fan forming the discharge throat 10, it being preferably rectangular in form and obviously elongated longitudinally of the back of the fan housing.

An adjustable section of the cylindrical portion of the housing is illustrated at 11, and the end walls 12 of which are in the form of a segment of the end of the fan and pivotally mounted upon the shaft 13 of the fan, but, of course, externally of the end walls 14 thereof. These end walls 12 of this adjustable section or visor member 11 each have an extension 15 thereupon, within the ends of which and transverse the front of the plow is installed a shaft 16 and upon which shaft are independently pivotally mounted a plurality of eccentrically shaped gate members 17. In this instance I have shown seven of such members, though this number may be varied as desired. These members are of light metal construction and function principally as automatically adjustable shoe members for raising or lowering the visor member 11 in respect to the snow engaged, simultaneously with acting as a closure to the front of the blade members of the rotor with the object of expediting the function in sucking in and conveying the snow to and through the discharge of the device.

It will be noted that each one of these gate or shoe members 17 has a considerable flat normally depending front portion 18 which readily slides up over any height of snow bank engaged in front of the machine until at least it assumes a position illustrated in dotted lines at 19, when, if sufficient of these members have mounted the bank of snow engaged to this position and the bank still increases in height, they will raise the visor arcuately and this movement may continue until the rearmost edge of the visor 11 reaches the discharge spout 20, or any point intermediate of the latter and the front limits of the section 8 of the fan housing where the forward action of the visor is stopped in any desired manner, as plainly illustrated.

It will be noted that the faces 18 of the gate members 17 extend somewhat below their arcuate backs so that when raised to the position shown in dotted lines, this projecting portion will contact the lower edge of the visor 11 and prevent further upward motion thereof, these members also being provided with a stop cleat 21 to limit their opposite motion as may be required.

The flat or arcuately shaped blades 22 of the fan may be carried in any desired manner upon the shaft 13, and I here mention either arcuate or flat, and refrain from a description of any specific form of spout, for these already vary materially in the art. However I have shown these blades 22 as being supported at their ends upon suitable spoke like members 23 fixed to the discs 24 adjacent the ends 14 of the rotor, and upon which discs are also attached adjacent the ends of the housing spoke like members 25 which carry, upon their extremities, the chisel or cutting bars 26 extending transverse the peripheral edge of the fan, and two of which chisel members are deemed sufficient to function as means for breaking up any hard or icy condition of the snow encountered. The front or cutting edge of these chisel members are serrated as clearly illustrated in the drawing and are made sufficiently strong to act as such.

It is to be noted that the end walls 14 of the rotor are provided with relatively large openings indicated at 27 to provide ample intake of air as it is well known that the suction of such a fan is axially thereof and the discharge is radially therefrom, except where housed as shown and the blades do draw circumferentially as they approach the discharge terminus of the snow receiving opening in the circumferential face of the housing. An additional functioning of the gate members 17 is to retard the centrifugal effect of the blades 22 against the incoming snow to the intake opening of the plow.

It will be noted that the discharge spout 20 is novel in that both the intake and discharge are elongated rectangular openings upon two sides of the hollow triangularly shaped member, said member having a width slightly greater than the width of the discharge 10 of the fan housing so as to preferably fit thereover, and the length of each opening is also slightly greater than the length of the discharge opening 10 for a like purpose so that when the spout is placed with one of its equal sides downwardly upon the discharge opening it will discharge the snow to the right of the machine as indicated by the arrows, Fig. 2, and when placed with the other of its discharge openings upon the nozzle 10 it will discharge the snow at the opposite side of the machine, thus providing an exceedingly convenient and simple discharge nozzle for the snowplow which functions admirably in throwing the snow in as fine and dust like particles as possible for cooperation with the wind that might assist in its distribution over a wide area and preventing large objectionable banks being formed of the discharged snow, this latter being the case with so many ordinary snow plows.

At 28 is illustrated a sheave fixed to one end of the fan shaft 13 for driving same as by the V-belt 29 leading to the motor 7, or other means for imparting motion to the fan, obviously being employed.

At 30 in Figure 2 is illustrated a pair of diagonally disposed braces for lateral strengthening of the forward extension 15 for support of the shaft 16 and which has been found in actual practice to be a material benefit.

Having thus described my invention, what I claim and desire to secure by Letters Patent, is:

1. In a snow plow adapted to be pushed by a vehicle, a horizontal chassis frame vertically adjustably attached to said pushing vehicle and pivotally supported upon a single transverse axle, a relatively large rotatable fan carried by the chassis forwardly of said supporting axle and discharging rearwardly and laterally of same, power means carried upon said chassis for rotating said fan, and oscillatory means carried by said chassis forwardly of said fan whereby to automatically regulate the entrance of snow to said fan.

2. A snow plow unit adapted to be pushed by a source of power from the rear thereof, said unit having its own steering and vertically adjusting mechanism, and a centrifugal snow handling fan in the forward end thereof, further characterized by having an automatic oscillatory closure regulating the size of the snow entrance to said fan.

3. A snow plow unit comprising in combination a chassis frame mounted upon a single transverse carrying axle, a centrifugal fan forwardly of said axle for gathering and discharging snow, and an automatic snow entrance gate for said fan, said gate comprising a transverse shaft spaced forwardly of said fan, a plurality of oscillatory cam-like members pivotally supported upon said shaft and operable independently by a predetermined depth of snow in front of said fan and beyond which depth they operate in unison to further regulate said gate.

4. The combination with a centrifugal fan for handling snow surrounded by a cylindrically shaped housing, the front circumferential portion of said housing being adjustable pivotally in respect to said fan, and means carried forwardly of and fixed to said front portion whereby the snow entrance to said fan is automatically controlled.

5. The combination with a centrifugal fan for handling snow surrounded by a cylindrically shaped housing, the front circumferential portion of said housing being adjustable pivotally in respect to said fan, and means carried forwardly of and fixed to said front portion whereby the snow entrance to said fan is automatically contolled, said means including a shaft transverse the front of said housing and carried by said pivotal portion thereof and a plurality of swingable members carried upon said shaft normally depending therefrom and in front of the entrance to said housing.

SELDEN G. WASHBURN.